UNITED STATES PATENT OFFICE.

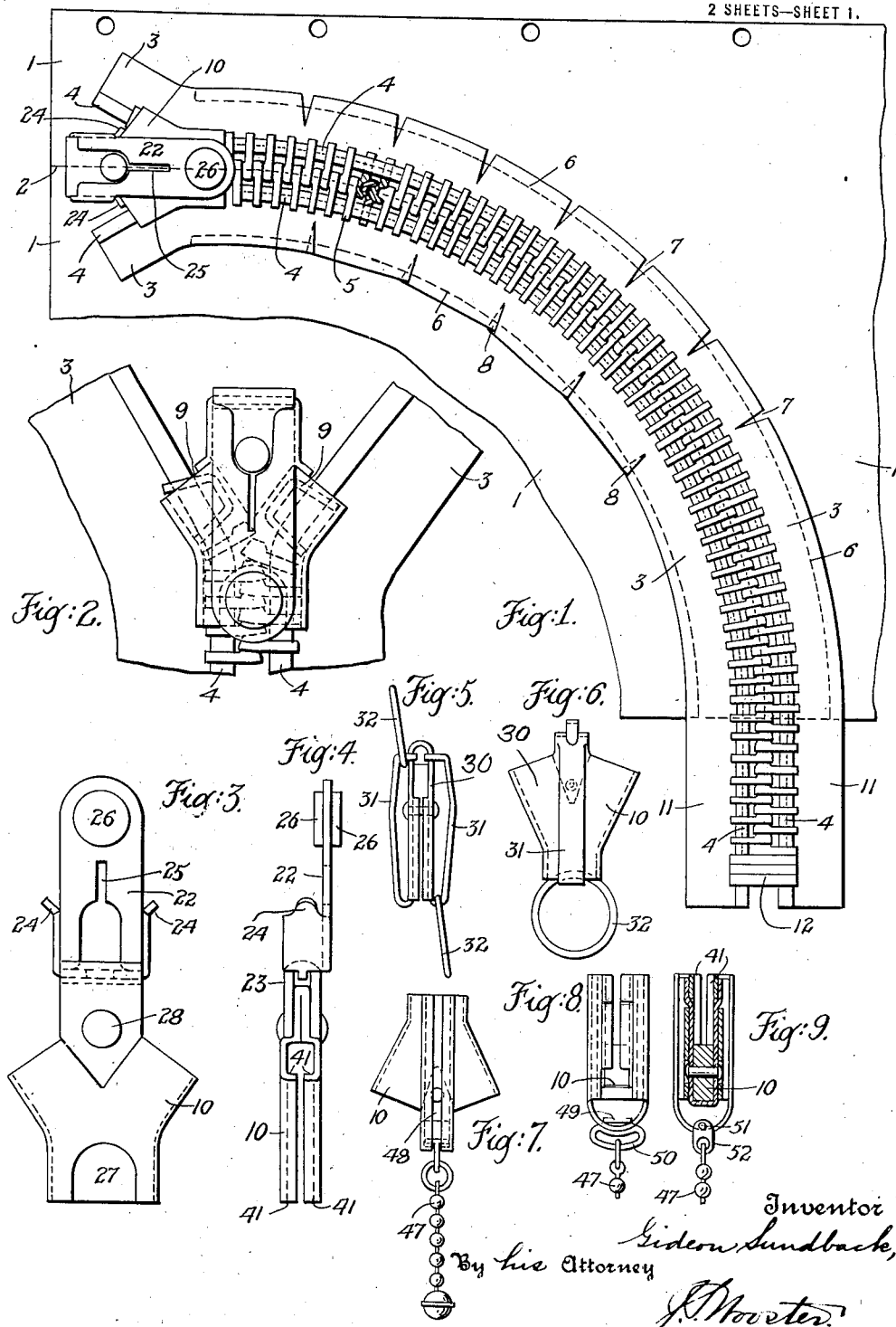

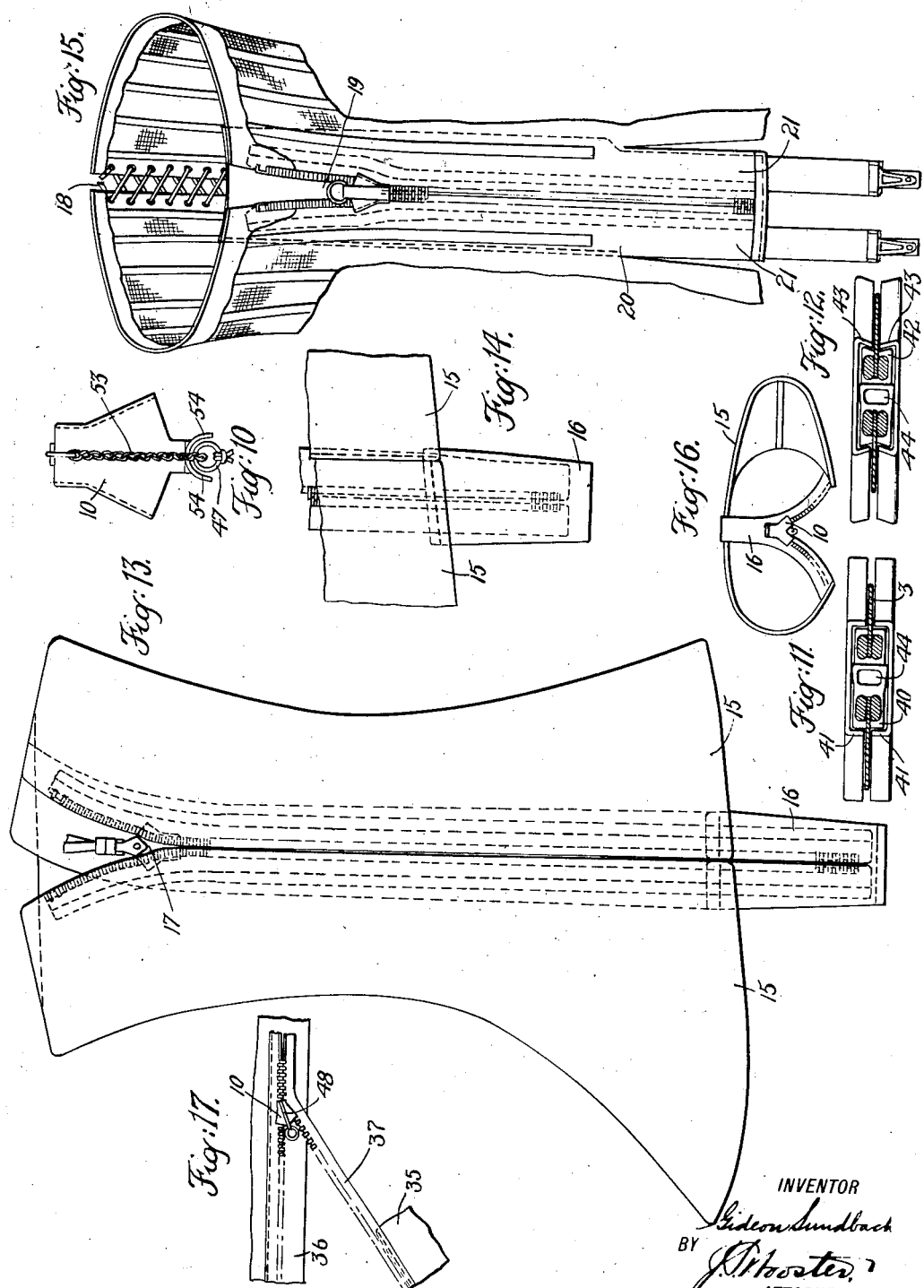

GIDEON SUNDBACK, OF MEADVILLE, PENNSYLVANIA, ASSIGNOR TO HOOKLESS FASTENER COMPANY, A CORPORATION OF PENNSYLVANIA.

FASTENER.

1,403,988.     Specification of Letters Patent.     Patented Jan. 17, 1922.

Application filed April 2, 1917, Serial No. 159,139. Renewed May 17, 1919. Serial No. 297,958.

*To all whom it may concern:*

Be it known that I, GIDEON SUNDBACK, a subject of the King of Sweden, residing at Meadville, in the county of Crawford and State of Pennsylvania, have invented a new and useful Improvement in Fasteners, of which the following is a specification.

This invention relates to fasteners of the type wherein closures for the edges of a garment, curtain, bag, tent or the like are to be separably connected by a fastener which embodies a sliding operating device which separates the edges when moved in one direction and closes them when moved in the other direction.

The fastener of this invention is generally intended for uses involving unusual strains and excessive wear, and in order to meet the conditions thus imposed, improvements have been made in various cooperating parts of the fastener, so that it can be standardized and manufactured by automatic machinery in large quantities for a wide diversity of uses. If these fasteners have to be separately designed for each different use, and manufactured by different equipment, the costs run up so high as to restrict the adoption of the fastener for purposes to which it is otherwise ideally adapted by reason of its convenience and mechanical operation. Although the finished fasteners of this invention may differ in lengths according to the particular use intended, there are certain similar features irrespective of use such as strength, ease and positiveness of operation, applicability to curved as well as straight line closures, and increased freedom of movement of one of the parts of the device to which the fastener is applied relatively to the other. By the cooperation of these features, a fastener is produced which can be applied to a diversity of uses which have not heretofore been considered possible, and without objectionable increase in cost of manufacture. For example, the fastener of this invention is applicable to a stiff edged closure, such as a corset, whereas previous attempts have been unsatisfactory. Also to curved closures such as a garment, or a curtain, which have not heretofore been attempted. Also to closures where wide separation without complete disconnection is desired, such as in corsets, spats, curtains, etc.

In providing a fastener to meet these general requirements, and particularly a fastener of the type embodying stringers carrying interlocking members, and a sliding cam operating device, I make the fastener positively operable to open as well as close and preferably from either side, instead of only positively closing, as heretofore, and construct the slider and interlocking members so as to engage and prevent heavy strains from distorting the slider. By positively actuating the slider in either direction, the angle between the slider channels can be made smaller thereby requiring less bending of the closure edge and less effort to operate, and also enabling stiff edges to be equipped with the fastener. By a novel arrangement of stringers and connecting members cooperating with a small angle slider, curved edges can readily be opened and closed, or combined with a straight edge closure, while by extending the stringers beyond the edge or edges of the body, and permanently connecting the stringer extensions, a much wider opening can be secured, or a greater swing of one or both of the connected parts. This enables garments and curtains to be widely opened, or a curtain to swing bodily when partly disconnected from its support.

An additional detail improvement consists in providing the slider with means for locking the fastener in closed position, instead of using separate means such as hooks and eyes, buttons, etc., as heretofore.

In the accompanying drawings,

Figure 1 is a perspective view of the improved fastener.

Figure 2 is a detail showing the fastener closed and locked.

Figure 3 shows the locking device open in position to be used as an actuating means.

Figure 4 is a side view of Figure 3.

Figures 5 and 6 are detail views of a modified form of slider actuating means.

Figures 7 and 8, show a further modification, in which a single pull device is capable of actuating the slider in either direction on either side.

Figure 9 shows a slight change over Figure 8.

Figure 10 shows a still further change.

Figure 11 is a sectional view through the fastener and showing how distortion of the slider is prevented.

Figure 12 shows a slight modification of Figure 11.

Figure 13 shows an application of the invention to a spat.

Figure 14 shows a modification of Figure 13.

Figure 15 shows an application to a corset, and

Figures 16 and 17 illustrate the functions of the extensions in enabling a wide separation.

1 represents a body having the edges 2, 2 which are to be closed. The fastener embodies stringers 3, 3, composed of tapes having corded edges 4, 4 to which the interlocking members 5 are clamped in staggered relation by compressible jaws. In Figure 11, the ends 40 of these jaws are at a right angle to the stringer 3, and these ends cooperate with the correspondingly inturned edge 41 of the slider 10, so as to prevent wedging apart of the slider, as when the fastener is being closed against a heavy strain. In Figure 12, the same result is carried out by undercutting the inner end of the jaw member, as at 42, and inturning the slider edge to an acute angle, as at 43, so that a sliding interlock is obtained without distorting the slider between the jaw member and the slider edge. This construction enables the body members to be closed against a considerable resistance because the interlocking ends of the jaw members are backed up and cannot become displaced during interlocking.

The angle between the diverging slider channels is an important feature of the invention. As shown in the drawings, the channels are not continuously curved, as has heretofore been the practice, but are practically straight and meet at a small angle so that the slider does not slide when the stringers are pulled apart, but has to be positively actuated in order to open, as well as close. By reducing the bending of the stringers in the slider, the fastener is applicable to stiff edged closures, such as corsets which cannot bend much in their own plane, and does not tend to open when not fastened at the top. This low angle slider also cooperates well with a curved closure, such as shown in Figure 1, since in many uses part of the closure will be straight, and the remainder curved, and the slider must work equally well on both. The body edges 2, 2 may be curved as shown, and the stringers 3 are secured parallel thereto by stitching 6. The outer stringer is either stretched, and the inner stringer contracted, or the outer stringer may be gored as at 7 to enable it to curve and stretch in its own plane and the inner stringer folded as at 8 to enable it to curve and contract in its own plane. The interlocking members 5 consist of small stampings having a socket 44 on one side and a head on the other, see Figures 1 and 11, both the head and socket being transversely rounded from edge to edge, so that universal movement will be permitted both in locking and unlocking, and in lateral bending. The members on the stringer of greater radius are spaced farther apart than those on the other stringer, thus making one stringer longer than the other. A fastener composed of these interlocking members can be doubled on itself without unlocking the members.

The locking means shown in Figure 3 consists of a plate 22 pivoted in the reinforcing loop 23 of the slider 10, and having spring wings 24 which resiliently engage the ends of the slider channel when the plate 22 is swung downwardly from the position shown in Figure 3 to that shown in Figure 2. At this time the wings 24 close over the ends of the slider channels and obstruct passage of the stop members 9, as shown in Figure 2. 25 is a slot in the plate 22 to increase its resiliency, and 26 are buttons or projections to furnish a finger hold. One projection 26 fits into the slot 27 in the bottom of the slider. 28 is a fastening which secures the loop 23 to the doubled slider body 10. The slider can be positively actuated in either direction through the plate 22.

In Figures 5 and 6 is shown a double reversible slider without the lock, which can be used with advantage for curtain and other closures which require to be operated from either side. The fastener body 30 carries a loop 31 on each side extending from top to bottom of the fastener, mounted in each loop is a pull ring 32, by which the fastener can be positively pulled in either direction from either side.

A preferred form of positive slider actuating means is shown in Figures 7 and 8, wherein a single pull device operates the slider in either direction on either side, such as in an automobile curtain. The slider carries a channel 48 formed by a slotted loop, and in this channel slides a shoe 49 having an elongated eye 50 to which the chain 47 is connected. The elongated eye 50 prevents canting of the shoe and slider, and insures that the slider will be pulled from either end with the least canting resistance. In Figure 9, the shoe consists of pins 51 on opposite sides of a flat plate 52 having a rounded inner end and of sufficient thickness and width to slidably fit the guide slot, the chain 47 being attached to the other end as shown. In Figure 10, the slider carries a chain loop 53 extending around from end to end of the slider and passing intermediately between lugs 54 which prevent displacement. This gives a positive pull in either direction on either side with a single pull device which avoids possible confusion due to a plurality of pulls.

One or both of the stringers 3 are provided at the closing end with stop members 9, passing within the slider 10, and engaging each other to prevent further movement.

Beyond the end of the body 1, the stringers are extended to constitute extensions 11, and these extensions are connected at their extreme ends by link members 12. The extensions 11 may or may not be provided with the locking members 5, but the extensions 11 are of such length that when the slider 10 is stopped at the link member 12, the body can be separated to such an extent that the extensions 11, owing to their flexibility, will straighten out end to end. In the fasteners as heretofore used, without extensions, the end members 12 would connect the lower end of the body edges 2, 2, and the slider would consequently not go the entire length and not permit the edges 2, 2, to entirely separate. By reason of the extensions to receive the slider, as much opening may be secured as desired, depending upon the length of the extensions. If the top of the slider is two inches below the lower edge of the body, a maximum separation of the lower edges of approximately four inches is permitted. For attaching an automobile side curtain to a top, as in Figure 17, six inch extensions permit the curtain when disconnected to be swung upwards of eleven inches in any direction without being completely detached, which is a decided advantage in enabling the curtain to be conveniently rolled up and stored.

In Figure 13, for example, is shown an application of these extensions to a spat, in which 15 represents the body of the spat provided with the fastener as shown, the strap 16 being split and carrying the stringer extensions. When the slider 17 is moved down to the extreme bottom, the instep strap 16 stretches out end to end and makes such a wide opening that the spat can easily be slipped on and off the foot without disconnecting the strap from the body, as is the usual custom. In Figure 14 the strap is not split as in Figure 13, and only one stringer is connected thereto, the strap also being sewed only to the body 15 on the side to which the stringer is attached. Thus the slider can go down to the lower end of the stringers as in Figure 13, and the stringers will stretch out end to end so as to provide the wide opening. Inasmuch as the body of the spat 15 overlaps the free side of the strap, it makes no difference that the strap is not attached to the body on both sides.

In Figure 15, the extension principle is applied to a boned edge corset, and permits the corset to be readily put on or taken off without requiring complete opening, and doing away with the ordinary clasps. 18 is the usual lacing, and 19 is the fastener of this invention. The body of the corset ends at 20, and 21 are the extension members. When the slider is moved down to the lower portion of the extensions 21, these can stretch out end to end to such an extent as to permit the corset to be stepped into or out of without complete separation, and when the slider is pulled up the corset will be quickly and firmly fastened.

In Figure 17, the extension principle is applied to a curtain 35 carried by a body or support 36, such as a tent, automobile top, etc., and the stringer extension 37 is sufficiently long to permit the cutain 35 to be swung around relatively to the support when separated. The other stringer extension appears as attached to the body 36 for its entire length, but it can be partly free, as in the forms previously described.

By the foregoing improvements, a fastener is provided which is adapted to be positively locked under heavy strains without distorting the slider; which is applicable to curved edged closures by unequally, instead of equally, spacing the members, or to both in succession in the same device; which by means of the extensions provides a wide opening of a garment, or a wide swing of a curtain; which is positively operable in either direction and from either side; and in which the slider carries self contained locking means independent of buttons, hooks and eyes, etc.

The invention is applicable to many uses other than those mentioned herein by way of example, and it is obvious that various modifications and changes may be made in the details of construction without departing from the scope of this invention. As far as I am aware, I am the first to provide a curved fastener of this class; the first to secure a wide opening without complete disconnection; the first to provide a self-locking slider; and the first to provide a positively operable fastener in either direction on either side. By these improvements the field of application of this type of fastener is greatly enlarged, and yet the various uses can be met without special designs for each different use.

What is claimed, is:

1. A fastener comprising two stringers curving in a common plane, connecting members, and means sliding on both stringers for operating said connecting members to connect and disconnect the stringers.

2. A fastener as described in claim 1 having the stringers connected together at one end to limit the movement of said sliding device in disconnecting the stringers.

3. A fastener as described in claim 1 in which the connecting members on one stringer interlock with adjacent members on the other stringer.

4. A fastener as described in claim 3 in which the connecting members on the outer stringer are spaced farther apart than the members on the inner stringer.

5. A body having parallel curved meeting edges, like interlocking members on each edge unequally spaced according to the curvature, a slider having cam channels movable progressively to lock or unlock said members, and an extension beyond the body for receiving said slider after said edges are completely separated whereby to obtain additional separation.

6. In combination with curved body edges having continuous flexible stringers carrying unequally spaced interlocking members in staggered relation along adjacent edges, a channeled slider cooperating therewith, the inner ends of said members and said slider channel slidably interlocking to prevent spreading of the slider under heavy locking strain.

7. A curved fastener comprising parallel curved stringers, one being longer than the other, interlocking members secured thereto in staggered relation and spaced apart in proportion to the stringer length, and cam means sliding on said stringers for actuating said members to lock and unlock.

8. A fastener comprising two stringers curving in a common plane, like connecting members on each stringer in staggered relation, and means sliding on both stringers for operating said connecting members to connect and disconnect the stringers.

9. In combination with two portions of fabric lying in a common plane and having adjacent parallel curved edges, parallel curved stringers attached to the respective portions of fabric, one stringer being longer than the other and each having like interlocking members secured thereto in staggered relation, said interlocking members being spaced apart on each stringer in proportion to such stringer length, with the interlocking members on the outer side of the curve further spaced apart than those on the inner side of the curve, and cam means sliding on said stringers for actuating said members to lock and interlock.

In testimony whereof, I have signed my name to this specification in the presence of two subscribing witnesses, this 29th day of March, 1917.

GIDEON SUNDBACK.

Witnesses:
W. D. WALKER,
W. F. RUSSELL.